US011991760B2

(12) United States Patent
Kim

(10) Patent No.: US 11,991,760 B2
(45) Date of Patent: May 21, 2024

(54) METHOD AND APPARATUS FOR TERMINAL TO STORE AND DISCARD SEGMENTED RADIO RESOURCE CONTROL MESSAGE IN MOBILE WIRELESS COMMUNICATION SYSTEM

(71) Applicants: BLACKPIN Inc., Seoul (KR); Soenghun Kim, Hanam-si (KR); SIGNALIS CO., LTD., Daejeon (KR)

(72) Inventor: Soenghun Kim, Hanam-si (KR)

(73) Assignees: BLACKPIN Inc., Seoul (KR); Soenghun Kim, Hanam-si (KR); SIGNALIS CO., LTD., Daejeon (KR)

( * ) Notice: Subject to any disclaimer, the term of this patent is extended or adjusted under 35 U.S.C. 154(b) by 0 days.

(21) Appl. No.: 18/387,431

(22) Filed: Nov. 6, 2023

(65) Prior Publication Data

US 2024/0080915 A1    Mar. 7, 2024

Related U.S. Application Data

(63) Continuation of application No. PCT/KR2022/015467, filed on Oct. 13, 2022.

(30) Foreign Application Priority Data

Nov. 3, 2021 (KR) .......................... 10-2021-0150141

(51) Int. Cl.
*H04W 24/10* (2009.01)
*H04W 76/10* (2018.01)

(52) U.S. Cl.
CPC ........... *H04W 76/10* (2018.02); *H04W 24/10* (2013.01)

(58) Field of Classification Search
CPC ............................. H04W 76/10; H04W 24/10
See application file for complete search history.

(56) References Cited

U.S. PATENT DOCUMENTS

| 2020/0214063 A1* | 7/2020 | Hori ...................... H04W 76/27 |
| 2023/0044291 A1* | 2/2023 | Bergström ............ H04W 48/12 |

FOREIGN PATENT DOCUMENTS

JP         2021521739 B1    8/2021

OTHER PUBLICATIONS

International Search Report for International Patent Application No. PCT/KR2022/015467, dated Jan. 20, 2023.

(Continued)

*Primary Examiner* — Chuong A Ngo
(74) *Attorney, Agent, or Firm* — PNKIP LLC

(57) ABSTRACT

A Method and Apparatus for application layer measurement reporting upon synchronous reconfiguration is provided. The method includes transmitting to the base station a terminal capability information message about the application layer measurement and conditional handover and the reception of segmented downlink RRC message, receiving from the base station a first RRC reconfiguration message containing a other configuration and first information for SRB4, receiving a second RRC reconfiguration message containing a third RRC reconfiguration message from said base station, discarding the segments of the segmented RRC messages stored in the RRC when said third RRC reconfiguration message is applied due to the conditional reconfiguration execution, and discarding the segmented RRC messages stored in the PDCP when PDCP reestablishment is set in the second information for SRB4.

2 Claims, 12 Drawing Sheets

(56) References Cited

OTHER PUBLICATIONS

Ericsson et al., "Introduction of DL RRC segmentation," 3GPP TSG-RAN2 Meeting #109-e, Online, R2-2002159, Feb. 24-Mar. 6, 2020.
Samsung, "Inclusive language review for TS 36.331," 3GPP TSG-RAN WG2 Meeting #113e, Electronic Meeting, R2-2101988, Jan. 25-Feb. 5, 2021.
Qualcomm Inc., "QoE measurement collection and reporting continuity in mobility scenarios," 3GPP TSG-RAN WG3 Meeting #112e, E-Meeting, R3-211735, May 17-May 27, 2021.
3GPP TS 36.331 V16.6.0 (Sep. 2021); Technical Specification; 3rd Generation Partnership Project;Technical Specification Group Radio Access Network;Evolved Universal Terrestrial Radio Access (E-UTRA); Radio Resource Control (RRC);Protocol specification(Release 16).
3GPP TS 38.331 V16.6.0 (Sep. 2021); Technical Specification; 3rd Generation Partnership Project;Technical Specification Group Radio Access Network;NR;Radio Resource Control (RRC) protocol specification(Release 16).
3GPP TS 38.321 V16.6.0 (Sep. 2021); Technical Specification; 3rd Generation Partnership Project;Technical Specification Group Radio Access Network;NR;Medium Access Control (MAC) protocol specification(Release 16).
3GPP TS 38.300 V16.7.0 (Sep. 2021); Technical Specification; 3rd Generation Partnership Project;Technical Specification Group Radio Access Network;NR; NR and NG-RAN Overall Description;Stage 2(Release 16).
3GPP TS 38.306 V16.6.0 (Sep. 2021); Technical Specification; 3rd Generation Partnership Project;Technical Specification Group Radio Access Network;NR;User Equipment (UE) radio access capabilities(Release 16).
Qualcomm Incorporated, "QoE configuration, reporting and mobility," 3GPP TSG-RAN WG2 Meeting #116-e, e-Meeting, R2-2109565, Nov. 1-12, 2021.
Qualcomm Incorporated, "QoE pause and resume handling," 3GPP TSG-RAN WG2 Meeting #116-e, e-Meeting, R2-2109567, Aug. 9-27, 2021.
Qualcomm Incorporated, "Support of RAN visible QoE and per-slice QoE," 3GPP TSG-RAN WG2 Meeting #116-e, Online, R2-2109568, Nov. 1-12, 2021.
Intel Corporation, "QoE measurement configuration and general aspects," 3GPP TSG RAN WG2 Meeting #116-e, Electronic meeting, R2-2109662, Nov. 1-12, 2021.
Ericsson, "Running CR for Introduction of QoE measurements in NR," 3GPP TSG-RAN WG2 Meeting #116-e, Electronic Meeting, R2-2109865, Nov. 1-12, 2021.
Ericsson, "Configuration and reporting of QoE measurements," 3GPP TSG RAN WG2 #116-e, Electronic meeting, R2-2109866, Nov. 1-12, 2021.
Ericsson et al., "QoE measurements at resume, re-establishment and handover," 3GPP TSG RAN WG2 #116-e, Electronic meeting, R2-2109867, Nov. 1-12, 2021.
Ericsson, "Pause and resume of QoE measurements reporting," 3GPP TSG RAN WG2 #116, Electronical meeting, R2-2109868, Nov. 1-12, 2021.
Vivo, "Discussion on QoE configuration and reporting," 3GPP TSG RAN WG2 #116-e, e-Meeting, R2-2109984, Nov. 1-12, 2021.
Vivo, "Discussion on start and stop of QoE measurement," 3GPP TSG RAN WG2 #116-e, e-Meeting, R2-2109985, Nov. 1-12, 2021.
Vivo, "Discussion on other WI objectives," 3GPP TSG RAN WG2#116-e, e-Meeting, R2-2109986, Nov. 1-12, 2021.
Apple, "Supporting mobility for NR QoE," 3GPP TSG RAN WG2 #116-e, e-Meeting, R2-2110073, Nov. 1-12, 2021.
Apple, "RRC segmentation for NR QoE," 3GPP TSG RAN WG2 #116-e, e-Meeting, R2-2110074, Nov. 1-12, 2021.
Apple, "Pause/Resume functionality," 3GPP TSG RAN WG2 #116-e, e-Meeting, R2-2110075, Nov. 1-12, 2021.
Huawei et al., "Discussion on QoE measurement configuration and reporting," 3GPP TSG RAN WG2 #116-e Electronic, R2-2110605, Nov. 1-12, 2021.
Huawei et al., "QoE handling during UE mobility," 3GPP TSG RAN WG2 Meeting #116-e, Online, R2-2110606, Nov. 1-12, 2021.
Huawei et al., "RAN visible QoE," 3GPP TSG-RAN WG2 Meeting #116-e, Online, R2-2110607, Nov. 1-12, 2021.
Huawei et al., "Discussion on SA4/SA5 reply for QoE pause," 3GPP TSG-RAN WG2 Meeting #116-e, Online, R2-2110608, Nov. 1-12, 2021.
Nokia et al., "QoE configuration handling in RAN," 3GPP TSG-RAN WG2 Meeting #116 Electronic, Online, R2-2110720 (R2-2107513), Nov. 1-12, 2021.
Nokia et al., "QoE stop and pause," 3GPP TSG-RAN WG2 Meeting #116 Electronic, Online, R2-2110721, Nov. 1-12, 2021.
Nokia et al., "RAN control on QoE reporting," 3GPP TSG-RAN WG2 Meeting #116 Electronic, Online, R2-2110722 (R2-2110712/R2-2107514), Nov. 1-12, 2021.
ZTE Corporation et al., "Discussion on NR QoE pause/resume function," 3GPP TSG-RAN WG2 Meeting #116-e, Electronic meeting, R2-2110989, Nov. 1-12, 2021.
ZTE Corporation et al., "Discussion on buffer for NR QoE start and stop," 3GPP TSG-RAN WG2 Meeting #116-e, Electronic meeting, R2-2110990, Nov. 1-12, 2021.
ZTE Corporation et al., Discussion on NR QoE Configuration and Reporting, 3GPP TSG-RAN WG2 Meeting #116-e Electronic meeting, R2-2110991, Nov. 1-12, 2021.
Samsung, "Pause and resume in QoE," 3GPP TSG-RAN2 Meeting #116 Electronic, R2-2111131, Nov. 1-12, 2021.
Samsung, "QoE configuration in general aspects," 3GPP TSG-RAN2 Meeting #116 Electronic, R2-2111132, Nov. 1-12, 2021.
Samsung, "RRC segmentation for QoE configuration and report," 3GPP TSG-RAN2 Meeting #116 Electronic, R2-2111133, Nov. 1-12, 2021.
China Unicom et al., "38.300 running CR for Introduction of QoE measurements in NR," 3GPP TSG-RAN2 Meeting #116-e, Online, R2-2111162, Nov. 1-12, 2021.
China Unicom, "Discussion on NR QoE measurement and configurations," 3GPP TSG RANWG2 #116-e, Electronic meeting, R2-2111188, Nov. 1-12, 2021.
China Unicom, "Discussion on RAN visible of QoE," 3GPP TSG RAN WG2 #116-e, Electronic meeting, R2-2111191, Nov. 1-12, 2021.

* cited by examiner

METHOD AND APPARATUS FOR TERMINAL TO STORE AND DISCARD SEGMENTED RADIO RESOURCE CONTROL MESSAGE IN MOBILE WIRELESS COMMUNICATION SYSTEM

CROSS-REFERENCE TO RELATED APPLICATIONS

6 This application is a continuation of International Application No. PCT/KR2022/015467, filed on Oct. 13, 2022, which claims priority to and the benefit of Korean Patent Application No. 10-2021-0150141, filed on Nov. 3, 2021. The contents of the above applications are incorporated herein by reference in their entireties.

BACKGROUND

Technical Field

The present disclosure relates to application layer measurement reporting based on segmentation in mobile wireless communication system.

Related Art

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e. g. 60 GHz bands). In order to increase the propagation distance by mitigating propagation loss in the 5G communication system, various techniques are introduced such as beamforming, massive multiple—input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

SUMMARY

Aspects of the present disclosure are to address application layer measurement reporting upon synchronous reconfiguration. The method includes transmitting to the base station a terminal capability information message about the application layer measurement and conditional handover and the reception of segmented downlink RRC message, receiving from the base station a first RRC reconfiguration message containing a other configuration and first information for SRB4, receiving a second RRC reconfiguration message containing a third RRC reconfiguration message from said base station, discarding the segments of the segmented RRC messages stored in the RRC when said third RRC reconfiguration message is applied due to the conditional reconfiguration execution, and discarding the segmented RRC messages stored in the PDCP when PDCP reestablishment is set in the second information for SRB4.

DETAILED DESCRIPTION

Figure 1A:
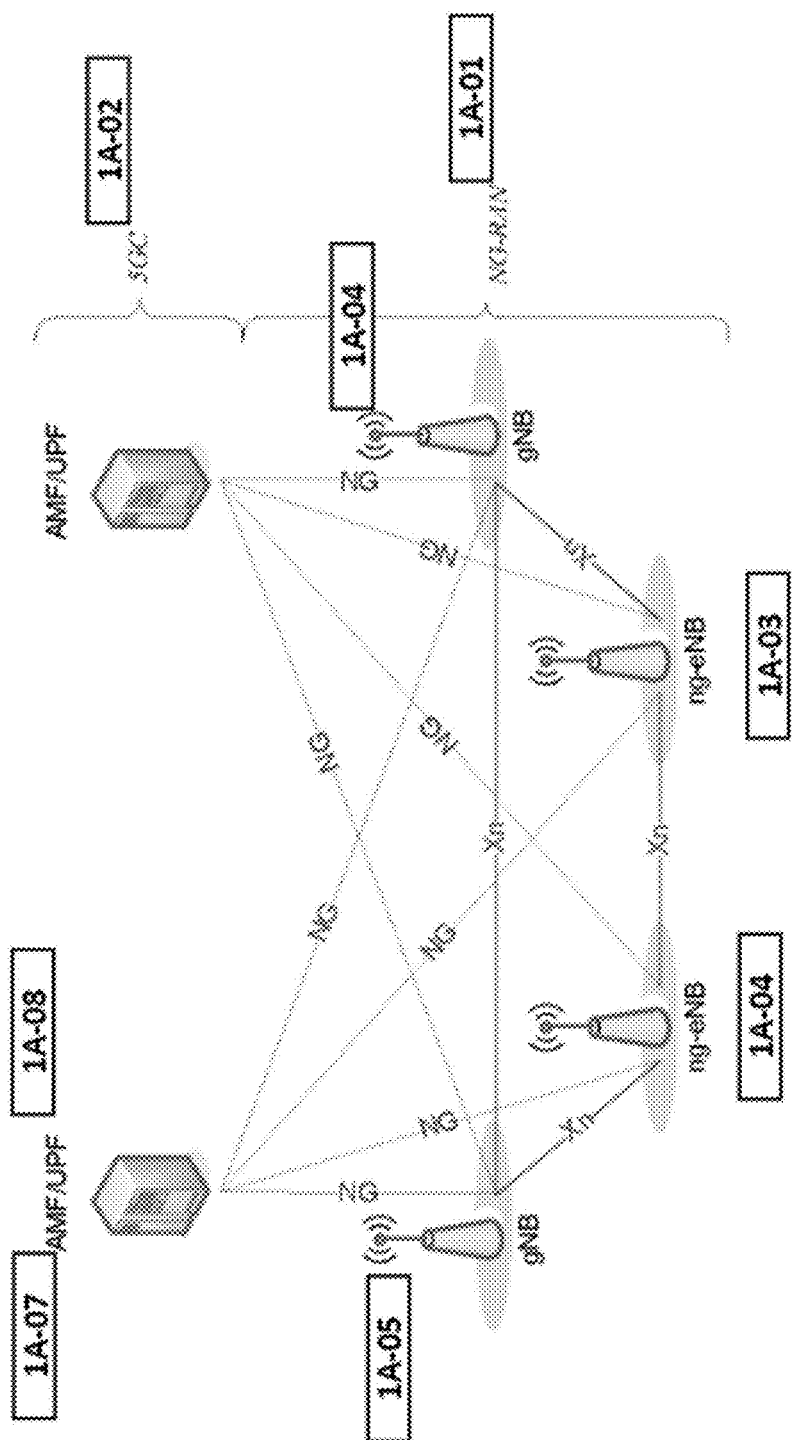
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |

TABLE 1-continued

| Acronym | Full name |
| --- | --- |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

Table 2 lists the terminologies and their definition used throughout the present disclosure.

TABLE 2

| Terminology | Definition |
| --- | --- |
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |

TABLE 2-continued

| Terminology | Definition |
| --- | --- |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logical ChannelGroup, allowedCG-List etc |
| logicalChannel Group | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |

TABLE 2-continued

| Terminology | Definition |
| --- | --- |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX DELIV | This state variable indicates the COUNT value of the first PDCP SDU not delivered to the upper layers, but still waited for. |
| RX NEXT | This state variable indicates the COUNT value of the next PDCP SDU expected to be received. |
| RX REORD | This state variable indicates the COUNT value following the COUNT value associated with the PDCP Data PDU which triggered t-Reordering. |
| Serving Cell | For a UE in RRC CONNECTED not configured with CA/DC there is only one serving cell comprising of the primary cell. For a UE in RRC CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:<br>parameters within Reconfiguration WithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is set", and "radio bearers for which the second resume procedure is enabled" may all have the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

- Functions for Radio Resource Management such as Radio Bearer Control, Radio Admission Control, Connection Mobility Control, Dynamic allocation of resources to UEs in uplink, downlink and sidelink (scheduling); and
- IP and Ethernet header compression, uplink data decompression and encryption of user data stream; and
- Selection of an AMF at UE attachment when no routing to an MME can be
- determined from the information provided by the UE; and
- Routing of User Plane data towards UPF; and
- Scheduling and transmission of paging messages; and
- Scheduling and transmission of broadcast information (originated from the AMF or O&M); and
- Measurement and measurement reporting configuration for mobility and scheduling; and
- Session Management; and
- QoS Flow management and mapping to data radio bearers; and
- Support of UEs in RRC_INACTIVE state; and
- Radio access network sharing; and
- Tight interworking between NR and E-UTRA; and
- Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
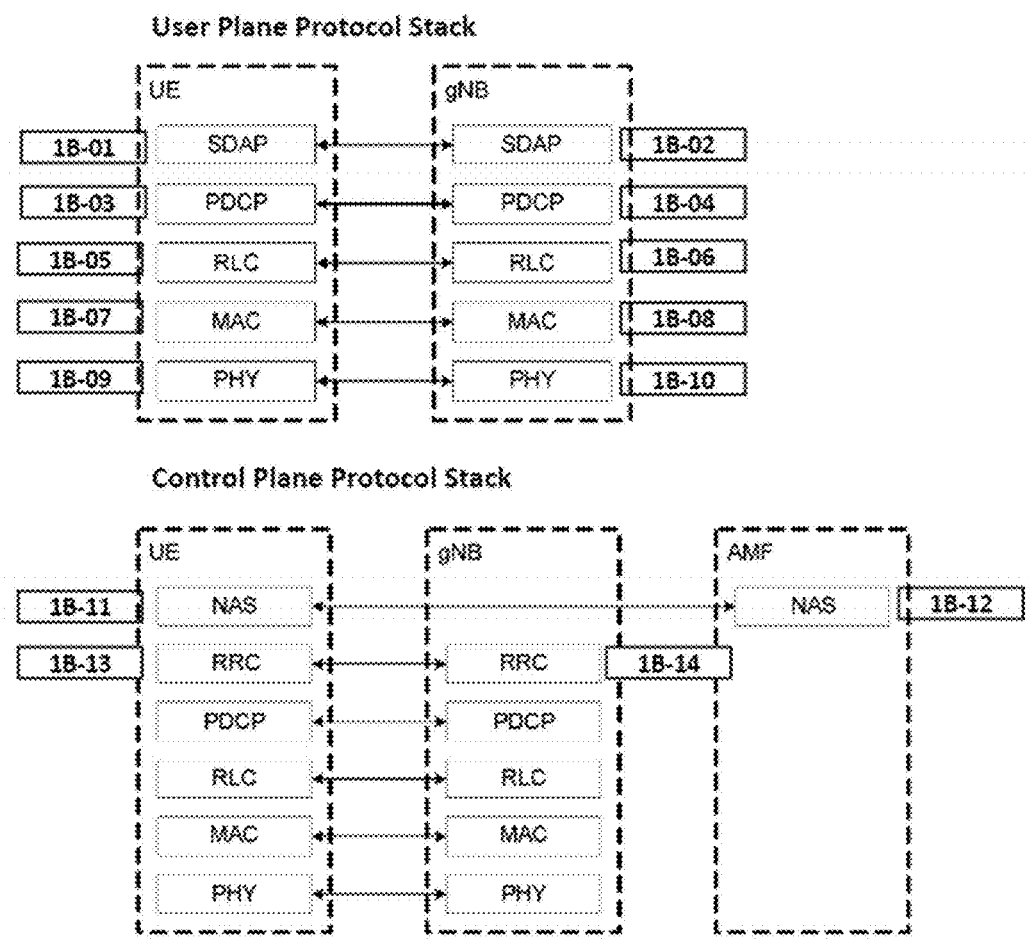
FIG. 1B is a diagram illustrating a wireless protocol architecture in an 5G system to which the disclosure may be applied.

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-11B-, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection;Broadcast of system information;Cell re-selection mobility; Paging is initiated by NG-RAN (RAN paging); RAN-based notification area (RNA) is managed by NG- RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. |

TABLE 4-continued

| RRC state | Characteristic |
| --- | --- |
| RRC_CONNECTED | 5GC - NG-RAN connection (both C/U-planes) is established for UE;The UE AS context is stored in NG-RAN and the UE;NG-RAN knows the cell which the UE belongs to; Transfer of unicast data to/from the UE; Network controlled mobility including measurements. |

Figure 1C:
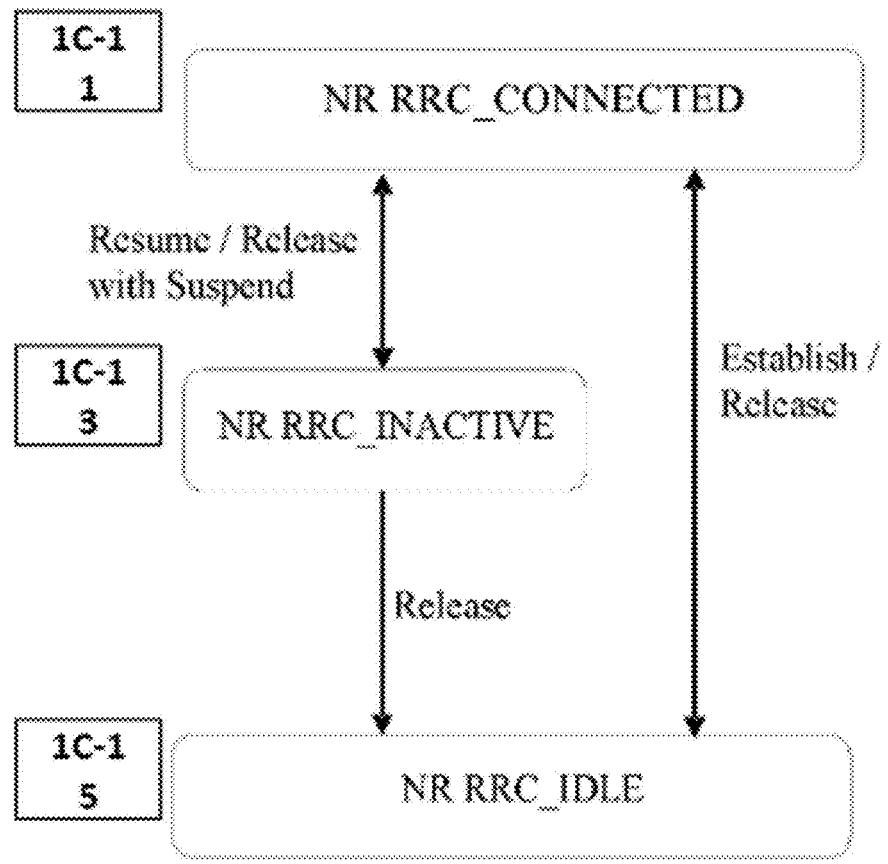
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

Figure 1D:
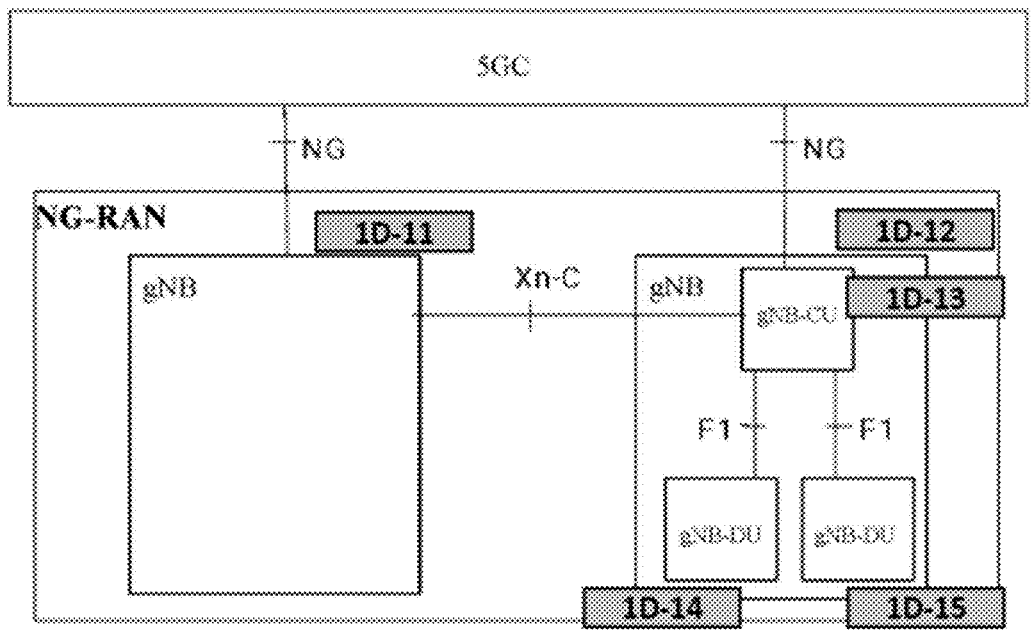
FIG. 1D is a diagram illustrating the structure of GNB.

FIG. 1D is a diagram illustrating the structure of GNB.

The GNBs 1D-11 or 1D-12 may include one GNB-CU 1D-13 and one or more GNB-DUs 1D-14 to 1D-15. The GNB-CU and GNB-DU are connected through the F1 interface. One GNB-DU is connected only to one GNB-CU. The GNB-CU provides RRC, SDAP, and PDCP protocol sublayers, and the GNB-DU provides RLC, MAC, and PHY protocol sublayers.

Figure 1E:
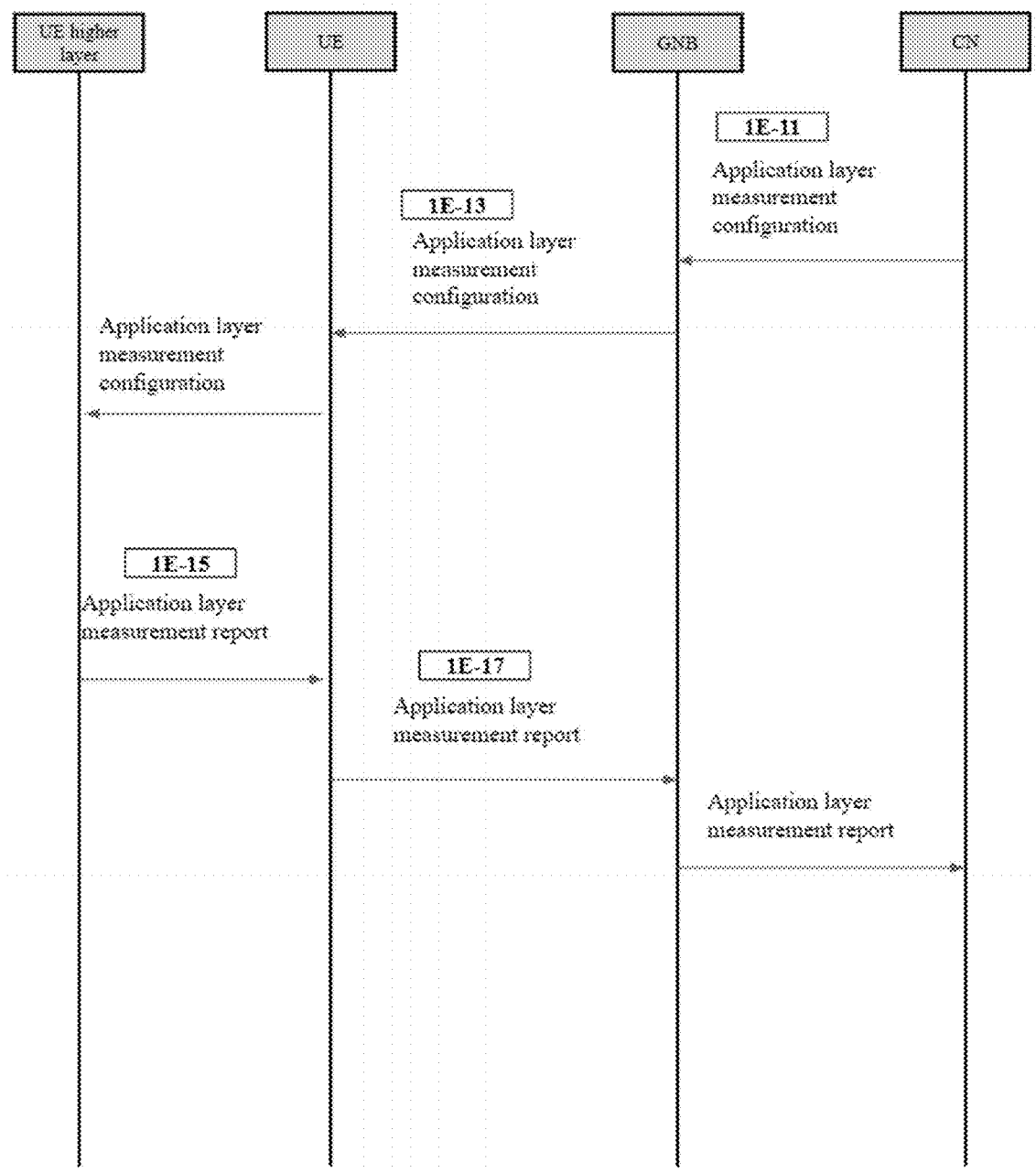
FIG. 1E is a diagram illustrating application layer measurement configuration and measurement report according to an embodiment of the present invention.

FIG. 1E illustrates the application layer measurement configuration and measurement reporting.

The application layer measurement collection enables collection of application layer measurements from the UE. The supported service types are QoE Measurement Collection for streaming services and QoE Measurement Collection for MTSI services.

The application layer measurement configuration and measurement reporting are supported in RRC_CONNECTED state only. Application layer measurement configuration received by the gNB from OAM or CN is encapsulated in a transparent container, which is forwarded to a UE in RRCReconfiguration message 1E-11 and 1E-13. It is further forwarded to UE's higher layer which is application layer for streaming services or for MTSI services.

Application layer measurement report received from UE's higher layer are encapsulated in a transparent container and sent to the network in MeasurementReportAppLayer message 1E-15 and 1E-17. It is further forwarded to the relevant CN entity which collects the measurement reports. An RRC identifier conveyed in the RRC signalling is used to identify the QoE configuration and report between the gNB and the UE. The RRC identifier is mapped to the QoE Reference in the gNB. The QoE measurement report is forwarded to OAM together with the QoE Reference. gNB can release multiple application layer measurement configurations from the UE in one RRC message at any time.

Upon reception of QoE release message, the UE discards any unsent QoE reports corresponding to the released application layer configuration. The UE discards the reports received from application layer when it has no associated QoE configuration configured.

Figure 2A:
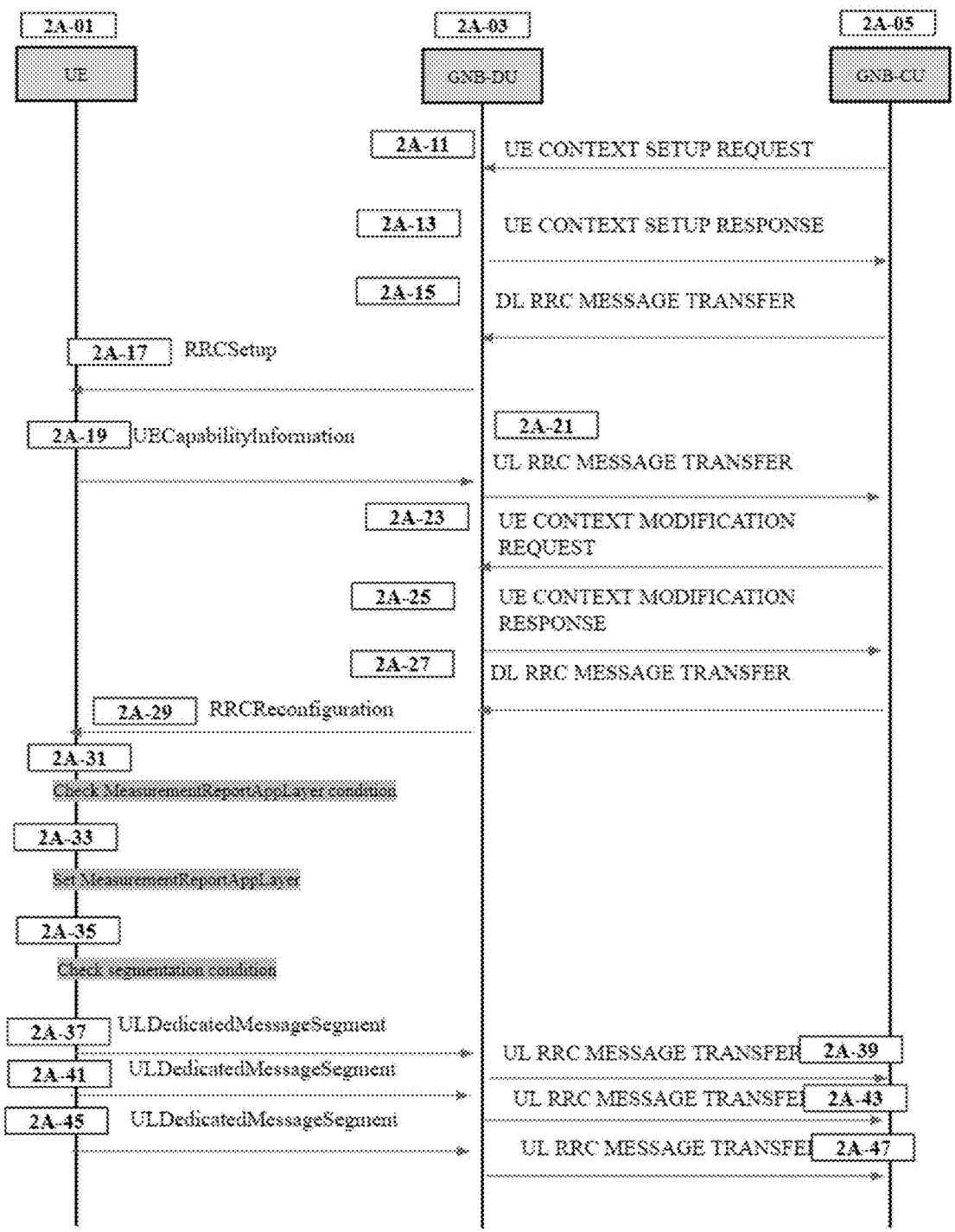
FIG. 2A is a diagram illustrating operations of a terminal and a base station according to an embodiment of the present invention.

FIG. 2A illustrates the operations of UE and GNB for the application layer measurement configuration and measurement reporting in details.

In FIG. 2A, some steps such as preamble transmission and UECapabilityEnquiry, not relevant with the invention are omitted.

In step 2A-11, GNB-CU transmits to GNB-DU UE CONTEXT SETUP REQUEST. This message is sent to request the setup of a UE context and SRB1. The message includes SRB to Be Setup Item IE for SRB1. SRB to Be Setup Item is configuration information for SRB. SRB ID in the SRB to Be Setup Item is set to 1. GNB-DU determines the configuration of RLC bearer for SRB1 and establishes the RLC bearer.

In step 2A-13, GNB-DU transmits GNB-CU UE CONTEXT SETUP RESPONSE. This message is sent to confirm the setup of a UE context. The message includes LCID for the SRB1 and RLC-BearerConfig for SRB1. GNB-CU makes RRC Setup message based on the contents of the CONTEXT SETUP RESPONSE and SRB-ToAddMod IE. A SRB-ToAddMod IE is configuration information for a SRB. SRB-ToAddMod IE includes srb-Identity and PDCP-config. GNB-CU determines PDCP-config for SRB1 and include the determined PDCP-config in SRB-ToAddMod IE. GNB-CU sets srb-Identity in SRB-ToAddMod IE to 1.

In step 2A-15, GNB-CU transmits to GNB-DU DL RRC MESSAGE TRANSFER. This message is to transfer RRC message to GNB-DU over F1 interface. This message includes RRC-Container which includes RRC Setup message. GNB CU sets SRB ID of the message to 0 to indicate that the RRC-Container includes RRC message to be transmitted over RLC bearer for SRB0.

In step 2A-17, GNB-DU transmits to UE RRCSetup message to establish SRB1. The message is transmitted over SRB0 and includes SRB-ToAddMod and RLC-BearerConfig. SRB-ToAddMod includes PDCP-config and srb-Identity. srb-Identity is set to 1 to indicate that it is for SRB1 configuration. PDCP-config is used to set the configurable PDCP parameters for signalling radio bearers and data radio bearers RLC-BearerConfig is to configure an RLC entity, a corresponding logical channel in MAC and the linking to a PDCP entity. It includes logicalChannelIdentity, srb-Identity, rlc-Config and mac-LogicalChannelConfig. srb-Identity is set to 1 to indicate that the RLC bearer is linked to SRB1.

UE establishes SRB1 based on RRCSetup. GNB may request UE to report capability by sending UECapabilityEnquiry. UE set the contents of UECapabilityInformation according to its capability and contents of UECapabilityEnquiry. UECapabilityEnquiry is sent via SRB1.

In step 2A-19, UE transmits to GNB-DU UECapabilityInformation. The message is used to transfer UE radio access capabilities requested by the network. It can include various capability information such as L1 capability, L2 capability, carrier aggregation related capability etc.

It can also include capability information regarding application layer measurement, qoe-Streaming-MeasReport and qoe-MTSI-MeasReport. qoe-Streaming-MeasReport defines whether the UE supports QoE Measurement Collection for streaming services. This field is ENUMERATED with a single value of "supported". If this field is included, UE supports QoE Measurement Collection for streaming services. qoe-MTSI-MeasReport defines whether the UE supports QoE Measurement Collection for MTSI services. This field is ENUMERATED with a single value of "supported". If this field is included, UE supports QoE Measurement Collection for MTSI services. UE reports above fields for NR and for E-UTRA separately. That is, UE reports qoe-Streaming-MeasReport and qoe-MTSI-MeasReport for E-UTRA, if Network requested E-UTRA capability, and reports qoe-Streaming-MeasReport and qoe-MTSI-MeasReport for NR, if Network requested NR capability.

In step 2A-21, GNB-DU transmits to GNB-CU UL RRC MESSAGE TRANSFER. This message includes UECapabilityInformation and SRB ID set to 1. GNB-CU refers to the UE capability and determines the configurations to be applied to the UE. GNB-CU may decide to establish SRB4 and enable application layer measurement.

In step 2A-23, GNB-CU transmits to GNB-DU UE CONTEXT MODIFICATION REQUEST. This message is to provide UE Context information changes to GNB-DU. The message includes SRB to Be Setup Item IE for SRB4. SRB ID in the SRB to Be Setup Item is set to any value. SRB ID is defined as INTEGER between 0 and 3 hence it cannot indicate SRB4. To indicate it is for SRB4, SRB4 indicator is included in the SRB to Be Setup Item. SRB ID is mandatory present and SRB4 indicator is optionally present. SRB ID being mandatory present is to ensure backward compatibility with earlier release network node. GNB-DU determines the configuration of RLC bearer for SRB4 and establishes the RLC bearer.

In step 2A-25, GNB-DU transmits GNB-CU UE CONTEXT MODIFICATION RESPONSE. This message is sent to confirm the modification of a UE context. The message includes LCID for the SRB4 and RLC-BearerConfig for SRB4.

GNB-CU determines SRB-ToAddMod IE for SRB4 and otherConfig for application layer measurement. GNB-CU makes RRCReconfiguration message based on the contents of the CONTEXT SETUP RESPONSE, determined SRB-ToAddMod IE and determined otherConfig IE.

In step 2A-27, DL RRC MESSAGE TRANSFER. This message is to transfer RRC message to GNB-DU over F1 interface. This message includes RRC-Container which includes RRCReconfiguration message. GNB CU sets SRB ID of the message to 1 to indicate that the RRC-Container includes RRC message to be transmitted over RLC bearer for SRB1.

In step 2A-29, UE receives RRCReconfiguration message from GNB-DU. RRCReconfiguration message includes a SRB-ToAddMod IE, a first otherConfig and a Second otherConfig.

SRB-ToAddMod IE includes srb-Identity, SRB4 Indicator and PDCP-config. GNB-CU determines PDCP-config for SRB4 and include the determined PDCP-config in SRB-ToAddMod IE. GNB-CU sets srb-Identity in SRB-ToAddMod IE to any value and include srb4Indicator in SRB-ToAddMod IE. srb4 Indicator is defined as enumerated with a single value of true. If it is included in a SRB-ToAddMod IE, UE considers SRB-ToAddMod IE is for SRB4 regardless of srb-Identity. If it is not included, UE consider the SRB-ToAddModIE is for SRB indicated by srb-Identity. srb-Identity is defined as INTEGER between 1 and 3. srb-Identity is mandatory present and SRB4 indicator is optionally present. srb-Identity being mandatory present is to ensure backward compatibility with earlier release network node.

OtherConfig contains configuration related to miscellaneous other configurations such as drx-PreferenceConfig, releasePreferenceConfig etc. First otherConfig is to configure application layer measurement. First otherConfig may include measConfigAppLayerToAddList, measConfigAppLayerToReleaseList and a rrc-SegAllowed IE. measConfigAppLayerToAddList includes one or more measConfigAppLayer IEs. measConfigAppLayerToReleaseList includes one or more measConfigAppLayerIds. a measConfigAppLayer IE includes measConfigAppLayerId, measConfigAppLayerContainer and serviceType. measConfigAppLayerContainer is the application layer measurement configuration generated by OAM and forwarded to UE's higher layer. serviceType indicates the type of application layer measurement. serviceType is enumerated with "streaming", "mtsi" and some spare values. Each measConfigAppLayer is identified with measConfigAppLayerId and forwarded to appropriate higher layer where measurement results are generated.

rrc-SegAllowed is defined as enumerated with a single value of "enabled". If it is present in otherConfig with one or more measConfigAppLayer IE, UE can apply RRC segmentation for the UL RRC message containing the application measurement result generated according to one of the plurality of measConfigAppLayer IEs.

Second otherConfig contains one of other configurations such as drx-PreferenceConfig, releasePreferenceConfig etc.

UE establishes SRB4. UE forwards measConfigAppLayerContainer to a higher layer considering serviceType.

In step 2A-31, UE determines whether to generate MeasurementReportAppLayer message. If configured with application layer measurement, and SRB4 is configured, and the UE has received, but not sent, application layer measurement report information from upper layers, UE determines to generates MeasurementReportAppLayer message and proceeds to 2A-33.

In step 2A-33, UE sets the measReportAppLayerContainer in the MeasurementReportAppLayer message to the value of the application layer measurement report information received from upper layer. UE sets the measConfigAppLayerId in the MeasurementReportAppLayer message to the value configured for the application layer measurement report information.

In step 2A-35, UE checks if RRC segmentation is needed. If RRC segmentation is needed, UE proceeds to 2A-37.

If the RRC message segmentation is enabled based on the field rrc-SegAllowed received in the first otherConfig, which contains the measConfigAppLayer IE corresponds to application layer measurement report information included in the encoded RRC message, and the encoded RRC message is larger than the maximum supported size of a PDCP SDU, then UE initiates UL message segment procedure to generates one or more ULDedicatedMessageSegment. Each ULDedicatedMessageSegment includes a segment of the encoded RRC message.

If the RRC message segmentation is not enabled and the encoded RRC message is larger than the maximum supported size of a PDCP SDU, then UE adjust the size of measReportAppLayerContainer such that the size of encoded MeasurementReportAppLayer is equal to or smaller than the maximum supported size. UE submits the message to lower layers for transmission via SRB4.

If the encoded RRC message is not larger than the maximum supported size of a PDCP SDU, UE submits the MeasurementReportAppLayer message to lower layers for transmission via SRB4. The maximum supported size of a PDCP SDU is 9000 bytes.

In step 2A-37, UE transmits to GNB-DU via SRB4 a ULDedicatedMessageSegment. The ULDedicatedMessageSegment message is used to transfer segments of the UECapabilityInformation message or to transfer segments of the MeasurementReportAppLayer message. ULDedicatedMessageSegment includes segmentNumber, rrc-MessageSegmentContainer and rrc-MessageSegmentType. segmentNumber is set to 0 and rrc-MessageSegmentType is set to notLastSegment.

In step 2A-39, GNB-DU transmits to GNB-CU UL RRC MESSAGE TRANSFER. This message includes the ULDedicatedMessageSegment, SRB ID set to any value and SRB4 indicator.

In step 2A-41, UE transmits to GNB-DU via SRB4 a ULDedicatedMessageSegment. segmentNumber is set to 1 and rrc-MessageSegmentType is set to notLastSegment.

In step 2A-43, GNB-DU transmits to GNB-CU UL RRC MESSAGE TRANSFER. This message includes the ULDedicatedMessageSegment, SRB ID set to any value and SRB4 indicator.

In step 2A-45, UE transmits to GNB-DU via SRB4 a ULDedicatedMessageSegment. segmentNumber is set to 2 and rrc-MessageSegmentType is set to LastSegment.

In step 2A-47, GNB-DU transmits to GNB-CU UL RRC MESSAGE TRANSFER. This message includes the ULDedicatedMessageSegment, SRB ID set to any value and SRB4 indicator. GNB-CU reassembles MeasurementReportAppLayer with received ULDedicatedMessageSegments and forward the report to appropriate core network node.

Figure 2B:
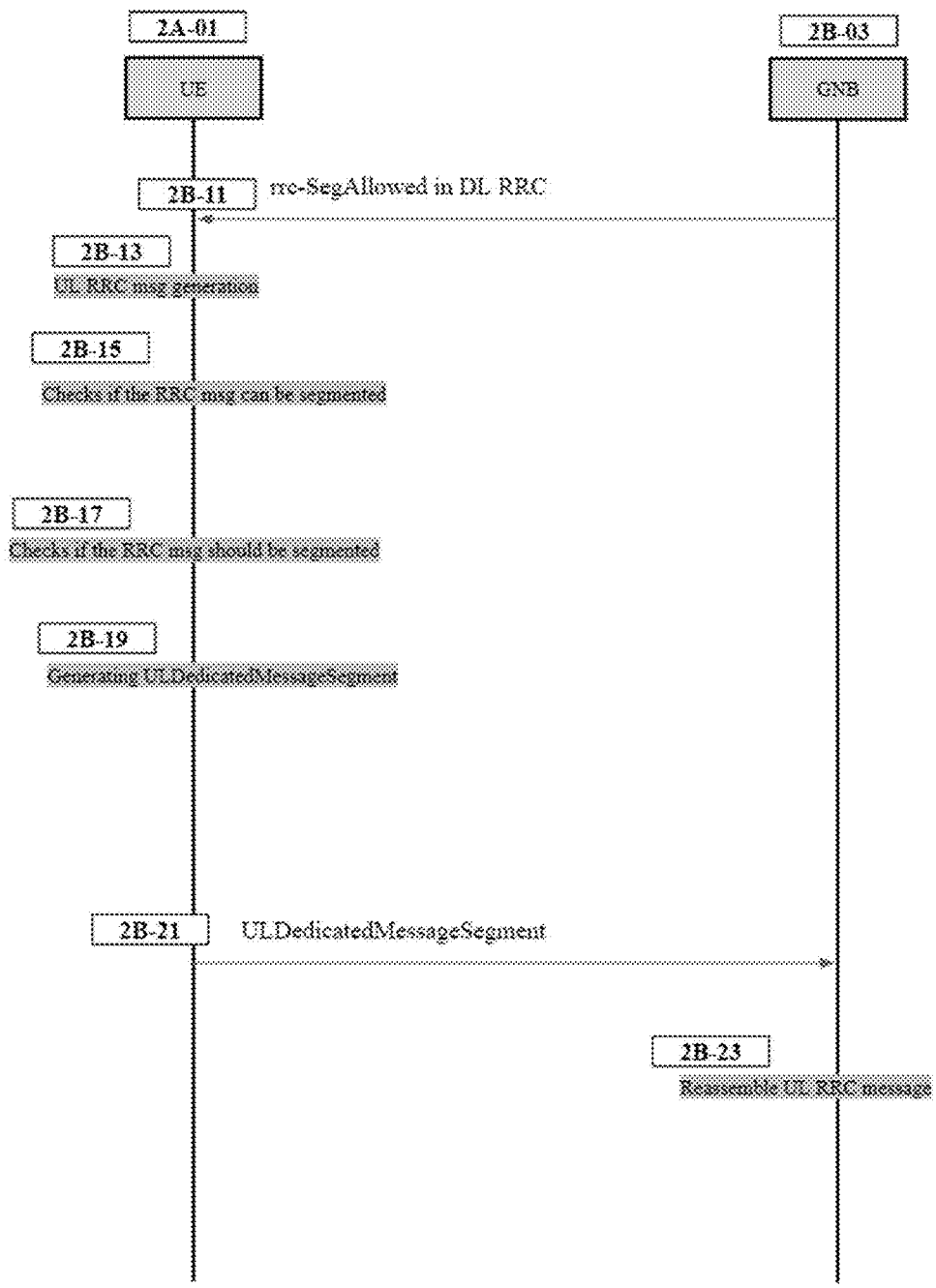
FIG. 2B is a diagram illustrating operations of a terminal and a base station for message segmentation according to an embodiment of the present invention.

FIG. 2B illustrates the operations of UE and GNB for uplink RRC segmentation.

There are various types of uplink RRC messages. Some of them could generate a message larger than the maximum size. Uplink RRC message segmentation can be defined to deal with such cases. To avoid reckless segmentation, GNB controls which uplink RRC message can be segmented and which SRB the segmented RRC message can be transmitted.

In step 2B-11, UE receives from GNB a DL RRC message including rrc-SegAllowed. The DL RRC message could be UECapabilityEnquiry or RRCReconfiguration including first otherConfig (or at least one measConfigAppLayer IE). The DL RRC message is received via SRB1.

In step 2B-13, UE generates a UL RRC message.

In step 2B-15, UE checks if the UL RRC message can be segmented. If the UL RRC message is UECapabilityInformation and the DL RRC message is UECapabilityEnquiry, or if the UL RRC message is MeasurementReportAppLayer and the DL RRC message is RRCReconfiguration including first otherConfig, the UL RRC message can be segmented.

In step 2B-17, UE checks if the UL RRC message should be segmented. If the UL RRC message can be segmented and the size of the encoded RRC message is larger than maximum supported size of a PDCP SDU, the UL RRC message should be segmented.

In step 2B-19, UE performs UL RRC message segmentation to generate a series of ULDedicatedMessageSegments.

For each new UL RRC message (UECapabilityInformation or MeasurementReportAppLayer), UE sets the segmentNumber to 0 for the first message segment and increment the segmentNumber for each subsequent RRC message segment. UE sets rrc-MessageSegmentContainer to include the segment of the UL RRC message corresponding to the segmentNumber. UE sets the MessageSegmentType to lastSegment if the segment included in the rrc-MessageSegmentContainer is the last segment of the UL RRC message. UE sets the MessageSegmentType to notlastSegment if the segment included in the rrc-MessageSegmentContainer is not the last segment of the UL RRC message.

In step 2B-21, UE transmits to GNB all the ULDedicatedMessageSegment messages generated for the segmented RRC message via SRB1 or SRB4 in ascending order based on the segmentNumber. If the DL RRC message is UECapabilityEnquiry and the UL RRC message is UECapabilityInformation, then the ULDedicatedMessageSegments are transmitted via SRB1. If the DL RRC message is RRCReconfiguration including at least one measConfigAppLayer IE and the UL RRC message is MeasurementReportAppLayer, then the ULDedicatedMessageSegments are transmitted via SRB4.

In step 2B-23, GNB reassembles the UL RRC messages from the ULDedicatedMessageSegments.

Figure 2C:
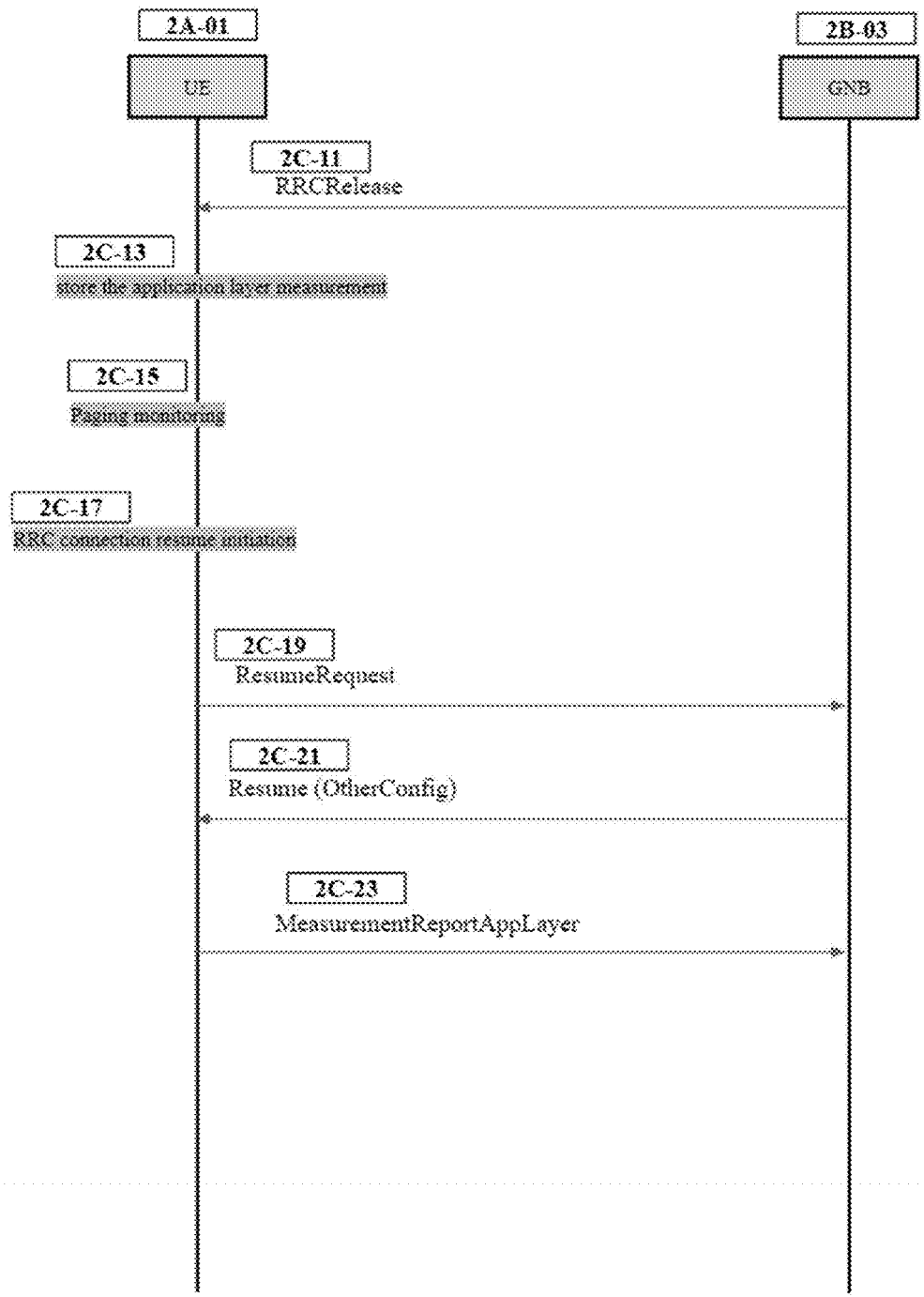
FIG. 2C is a diagram illustrating operations of a terminal and a base station for application layer measurement configuration and measurement reporting in INACTIVE state according to an embodiment of the present invention.

FIG. 2C illustrates the operations of UE and GNB for the application layer measurement configuration and measurement reporting in RRC_INACTIVE.

In RRC_INACTIVE, application layer measurement is still performed but application layer measurement reporting is disabled.

In RRC_CONNECTED, UE performs application layer measurement and reporting according to application measurement configurations.

In RRC_IDLE, application layer measurement configuration is released.

In RRC_INACTIVE, because UE may transit to RRC_CONNECTED shortly, application layer measurement configuration is kept but reporting is disabled.

In step 2C-11, GNB decides to perform state transition from RRC_CONNECTED to RRC_INACTIVE for a UE. GNB transmits to the UE RRCRelease message. The RRCRelease message includes SuspendConfig IE. SuspendConfig includes the following information.

<SuspendConfig>

1: The first terminal identifier: an identifier of a terminal that may be included in the ResumeRequest when a state transition to RRC_CONNECTED is made. It has a 40-bit length.

2: The second terminal identifier: an identifier of a terminal that may be included in the Resume Request when a state transition to RRC_CONNECTED is made. It has a 24-bit length.

3: ran-Paging Cycle: Paging cycle to be applied in RRC_INACTIVE state.

4: ran-Notification AreaInfo: Configuration information of a ran-Notification Area consisting of a list of cells and the like. The terminal initiates a resume procedure when the ran Notification Area is changed.

5: t380: Timer related to the periodic resumption procedure.

6: NextHopChangingCount (NCC): Counter used to derive new security keys after performing the resume procedure.

In step 2C-13, UE performs the SuspendConfig operation set. The SuspendConfig operation set is applied at a predetermined time point.

<SuspendConfig Operation Set>

1. Apply suspendConfig.
2. Reset MAC.
3. Reset SRB1's RLC entity.
4. Suspend all SRBs and DRBs
5. Store the application layer measurement configurations in the UE Inactive AS Context
6. Inform upper layers (The upper layers where measConfigAppLayer was forwarded) that application layer measurement reporting is disabled.
7. Start T380 set to t380.
8. Enter RRC_INACTIVE state.
9. Perform cell selection The predefined time point is as follows.

Earlier time point between a time point at which 100 ms has elapsed since receiving the RRCRelease message and a time point at which the lower layer successfully acknowledged the reception of the RRCRelease message.

Upon selecting a suitable cell, UE proceeds to step 2C-15.

In step 2C-15, UE starts paging monitoring. UE monitors a specific time/frequency resource to see whether paging message is received.

Upon reception of paging message including the first terminal identity, UE proceeds to step 2C-17.

Upon reception of paging message including a third terminal identity, UE releases the stored application layer measurement configurations and informs upper layers about the release of the application layer measurement configurations. The reason is because receiving such paging message means network consider UE in RRC_IDLE and has already released the measurement configurations. The third terminal identity is a temporary UE identity provided by the 5G Core Network. It is provided via a NAS message during registration procedure or tracking area update procedure.

Asides from above, in the following cases, UE releases the stored application layer measurement configurations and informs upper layers about the release of the application layer measurement configurations.

Upon abortion of connection establishment or connection resume by upper layer (NAS layer); and Upon reception of one of DL RRC messages like RRCResume, RRCSetup, RRCRelease with suspendConfig and RRCReject message.

In step 2C-17, UE initiates RRC connection resume procedure. When paging message including first terminal identity is received or when new data arrives or when T380 expires or when RNA update is triggered, UE initiates RRC connection resume procedure.

Upon initiating the procedure, UE releases the second otherConfig such as drx-PreferenceConfig, releasePreferenceConfig etc and keeps the first otherConfig.

In step 2C-19, UE transmits to GNB RRCResumeRequest message. The RRCResumeRequest message is used to request the resumption of a suspended RRC connection or perform an RNA update.

Upon receiving RRCResumeRequest, GNB identifies UE context based on the UE identity included in the message. GNB determines the configuration to be applied to the UE. GNB generates RRCResume based on the determination. GNB recognizes from the UE context which application layer measurement configuration is configured for the UE. GNB can include updated first otherConfig to release some of application layer measurement configurations. The updated first otherConfig includes measConfigAppLayerToReleaseList. GNB can release all the application layer measurement configurations by release SRB4.

In step 2C-21, UE receives RRCResume message.

If first otherConfig and srb4-release IE are not included in the RRCResume message, UE informs first upper layers that application measurement reporting is enabled.

If srb4-release IE is included in the RRCResume message, UE releases all the application layer measurement configurations and informs first upper layers about the release of the application layer measurement configurations.

If otherConfig is included and srb4-release IE is not included in the RRCResume message, UE releases application layer measurement configurations of Second upper layers, informs Second upper layers about the release of the application layer measurement configurations and informs third upper layers that application measurement reporting is enabled.

srb4-release IE is enumerated with a single value of true. If this IE is included in a RRC message, UE release SRB4.

The first upper layers are upper layers where measConfigAppLayerContainer in measConfigAppLayerToAddList received in RRCReconfiguration message was forwarded.

The second upper layers are upper layers that are associated with measConfigAppLayerId included in measConfigAppLayerToReleaseList received in RRCResume message.

The third upper layers are first upper layers that are not Second upper layers.

In step 2C-23, UE performs the operations illustrated in 2A-31, 2A-33, 2A-35, 2A-37, 2A-41 and 2A-45.

Figure 2D:
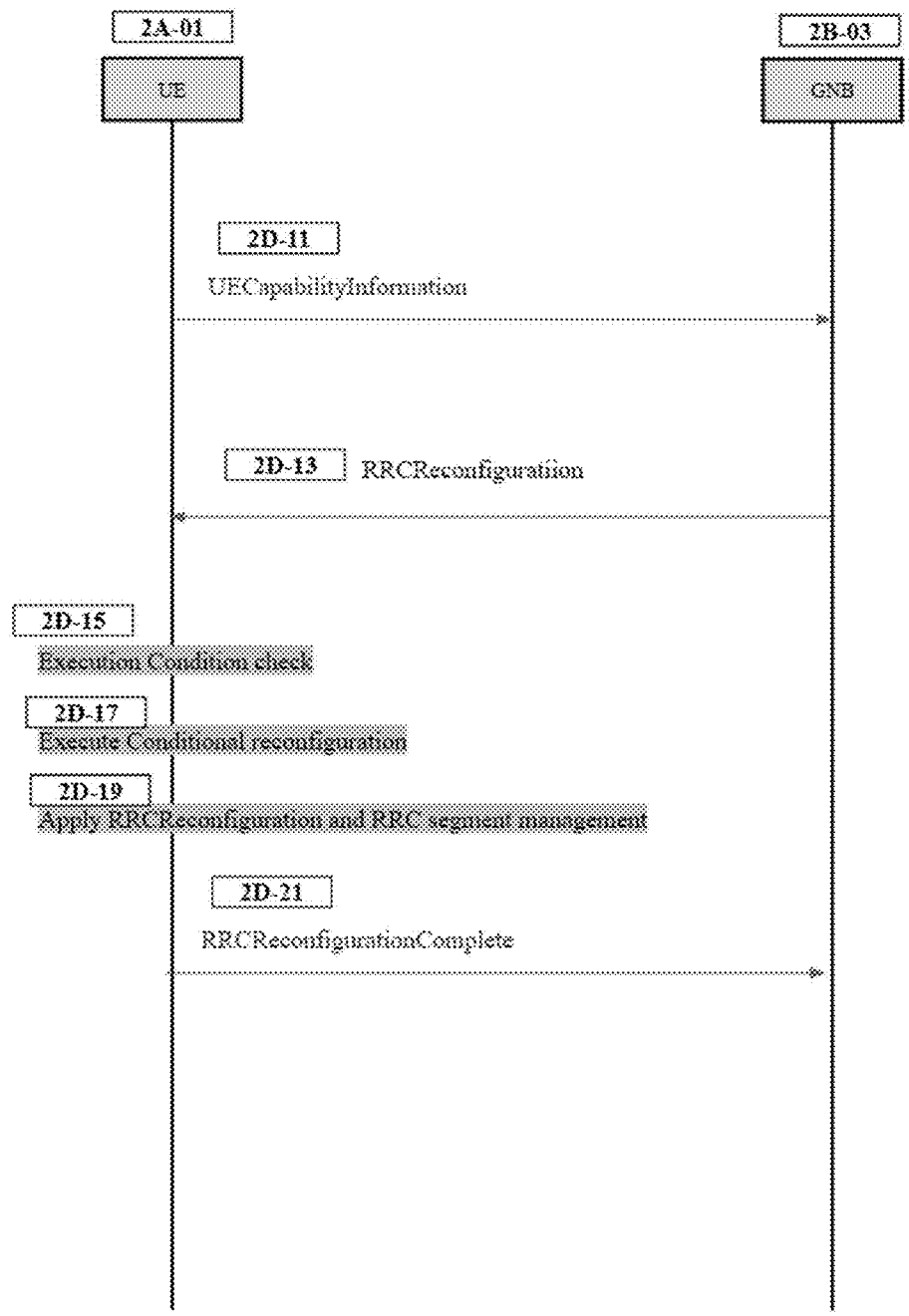
FIG. 2D is a diagram illustrating RRC segment management during handover according to an embodiment of the present invention.

FIG. 2D illustrates handling of RRC segments upon handover.

RRC segmentation can be applied to DL RRC messages as well. If handover occurs during transmission of segmented RRC messages, uplink RRC segment should be transmitted after handover but downlink RRC segment should not be. The reason is that uplink RRC message like MeasurementReportAppLayer is still useful in the target cell but downlink RRC message like RRCReconfiguration is useful only in the cell where the message is transmitted. In general, DL RRC message segmentation and handover does not occur at the same time because DL RRC message instructing handover is sent after the last RRC segment is transmitted. However, in case of conditional handover, RRCReconfiguration message instructing handover can be transmitted significantly earlier than handover execution. In such case, handover can occur in the middle of DL RRC segmentation.

In step 2D-11, UE transmits to GNB UECapabilityInformation. The first capability IE indicating whether the UE supports reception of segmented DL RRC messages can be included in the message. The second capability IE can be included in the message indicating whether the UE supports conditional handover including execution condition, candidate cell configuration and maximum 8 candidate cells. The first capability IE is per UE and the second capability IE is per band.

Based on the contents of UECapabilityInformation, GNB decides the configurations to be applied to the UE.

In step 2D-13, GNB transmits to UE RRCReconfiguration for conditional handover. RRCReconfiguration includes ConditionalReconfiguration IE which is used to add, modify and release the configuration of conditional reconfiguration. ConditionalReconfiguration IE includes condReconfigToAddModList IE. condReconfigToAddModList IE includes one or more CondReconfigToAddMod IEs. A CondReconfigToAddMod IE includes condExecutionCond IE and condRRCReconfig IE. condExecutionCond IE indicates the execution condition that needs to be fulfilled in order to trigger the execution of a conditional reconfiguration. condRRCReconfig IE includes RRCReconfiguration message to be applied when the condition(s) are fulfilled.

In step 2D-15, UE starts conditional reconfiguration evaluation based on condExecutionCond IE. Meanwhile, DL segmentation and/or UL segmentation can be started. If so, UL RRC segments can be buffered in PDCP entity of UE for transmission and DL RRC segments can be buffered in RRC for reassembly.

When conditions are fulfilled for a condExecutionConds, UE considers the target candidate cell within the associated condRRCReconfig as a triggered cell. UE proceeds to 2D-17.

In step 2D-17, UE performs conditional reconfiguration execution. If more than one triggered cell exists, UE selects one of the triggered cells as the selected cell for conditional reconfiguration execution. For the selected cell of conditional reconfiguration execution, UE applies the condRRCReconfig of the selected cell.

In step 2D-19, UE applies RRCReconfiguration and performs RRC segment management. If the RRCReconfiguration is applied due to a conditional reconfiguration execution, UE applies DL RRC segment management and UL RRC segment management. If the RRCReconfiguration is applied not due to a conditional reconfiguration execution, UE applies UL RRC segment management.

<DL RRC Segment Management>

UE checks if there is downlink segmented RRC messages that all segments have not been received. UE discard any segments of such segmented RRC messages stored in RRC.

<UL RRC Segment Management>

For uplink, if reestablishPDCP IE is included and retransmitPDCP is not included in SRB-ToAddMod for SRB4, UE discards PDCP SDUs and PDCP PDUs in the PDCP transmission buffer of SRB4. If reestablishPDCP IE is not included and retransmitPDCP is included in SRB-ToAddMod for SRB4, UE performs transmission of the PDCP SDUs in ascending order of the COUNT value associated to the PDCP SDU, from the first PDCP SDU for which the successful delivery of the corresponding PDCP Data PDU has not been confirmed by lower layers.

reestablishPDCP IE is enumerated with single value of true. retransmitPDCP IE is enumerated with single value of true. GNB controls UE behaviour towards SRB 4 after handover using reestablishPDCP IE and retransmitPDCP IE.

In step 2D-21, UE generates and transmits RRCReconfgurationComplete to GNB via SRB1. UE retransmits PDCP SDUs containing UL RRC segments via SRB4 after transmission of RRCReconfigurationComplete.

Figure 3A:
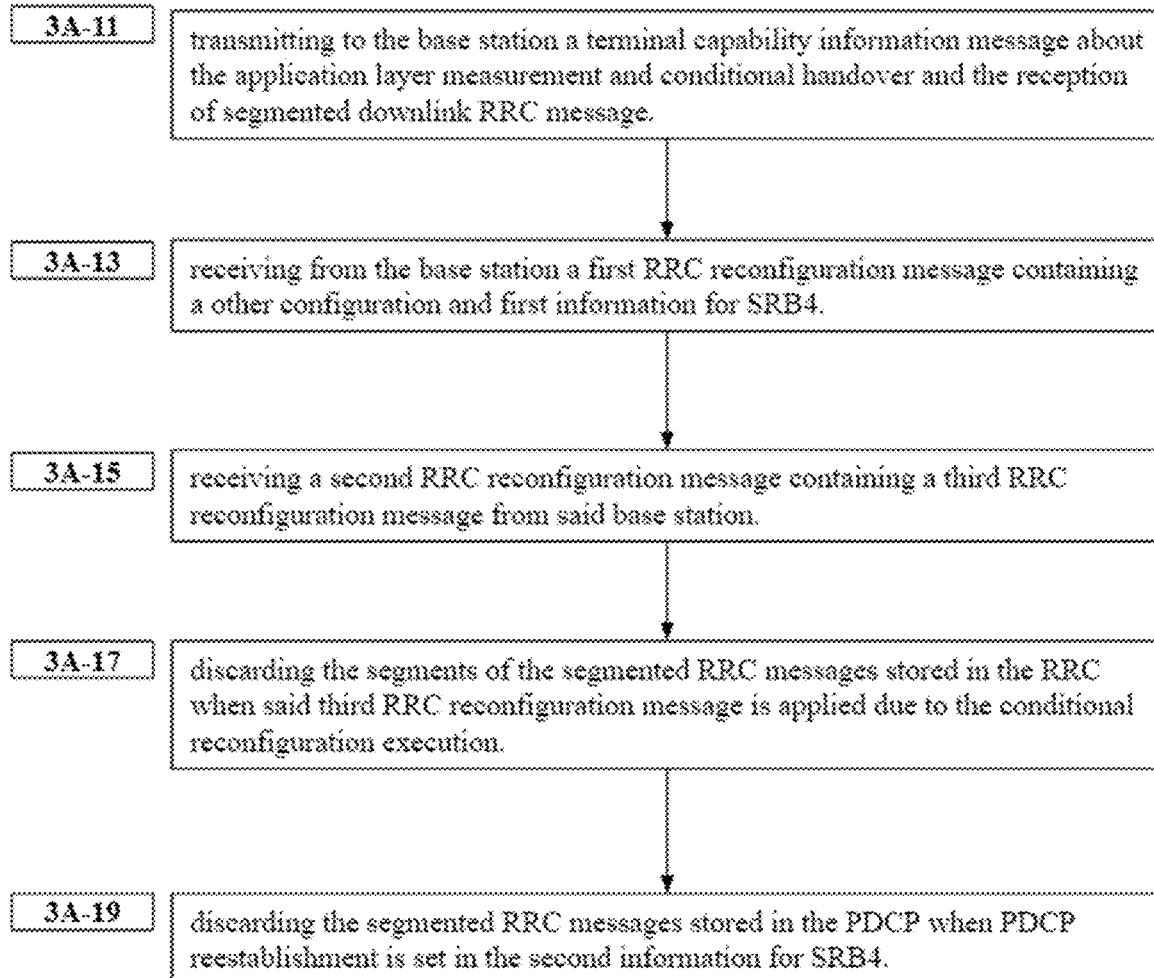
FIG. 3A is a flow diagram illustrating an operation of a terminal.

FIG. 3A illustrates the operation of the terminal.

In step 3A-11, the terminal transmits to the base station a terminal capability information message about the application layer measurement and conditional handover and the reception of segmented downlink RRC message.

In step 3A-13, the terminal receives from the base station a first RRC reconfiguration message containing a other configuration and first information for SRB4.

In step 3A-15, the terminal receives a second RRC reconfiguration message containing a third RRC reconfiguration message from said base station.

In step 3A-17, the terminal discards the segments of the segmented RRC messages stored in the RRC when said third RRC reconfiguration message is applied due to the conditional reconfiguration execution.

In step 3A-19, the terminal discards the segmented RRC messages stored in the PDCP when PDCP reestablishment is set in the second information for SRB4.

The third RRC reconfiguration message includes the second information for SRB4 and the configuration of the target specific cell.

The terminal capability information message comprising at least one of first capability information relating to an application layer measurement for a first service type in the NR and second capability information relating to an application layer measurement for a second service type in the NR, and a plurality of conditional handover related information elements (IEs) and one IE indicating whether the terminal supports receiving segmented downlink RRC messages in the NR.

The segmented RRC message may be a terminal capability information message, a measurement application layer message, or an RRC reconfiguration message.

The information about the SRB, wherein one SRB identifier field is mandatorily present and one SRB4 indicator field is optionally present.

If the SRB4 indicator field is not present in the information about said SRB, the identifier of said SRB is determined by said SRB identifier field, and if the SRB4 indicator field is present in the information about said SRB, the identifier of said SRB is 4.

Said SRB4 indicator field is enumerated with a single value of True.

In said other configuration, one split allow field, one measurement configuration application layer addition list field, and one measurement configuration application layer removal list field are optionally present.

Figure 4A:
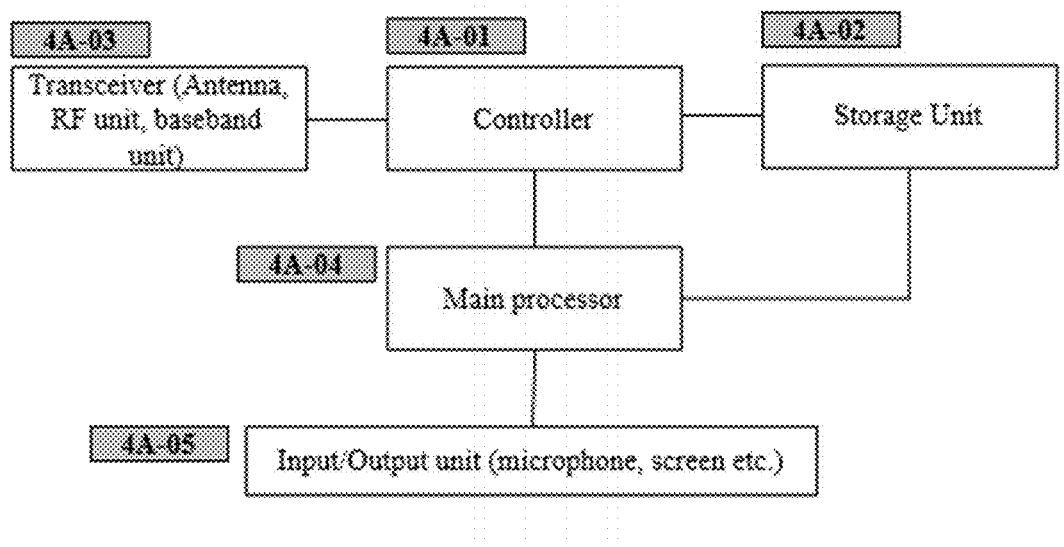
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
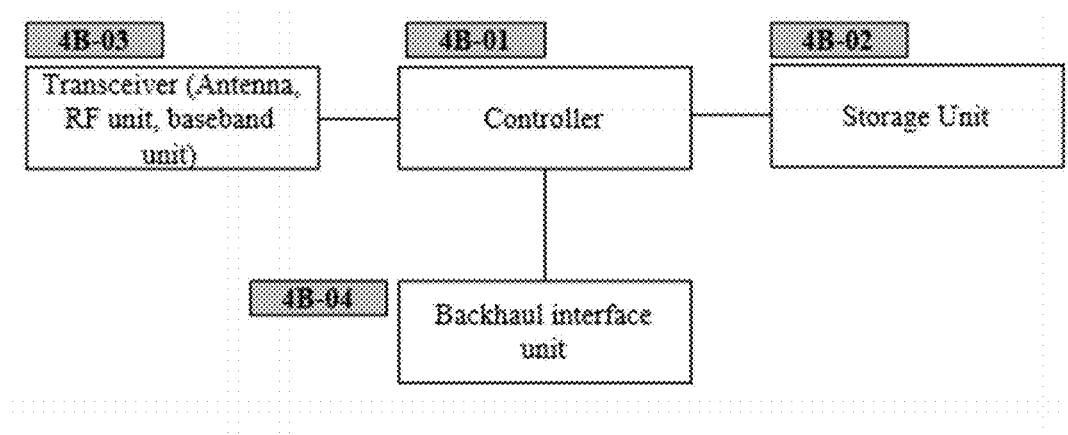
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to determine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method performed by a terminal in a wireless communication system, the method comprising:
    receiving, by the terminal from a base station, a first SRB-ToAddMod information element (IE);
    establishing, by the terminal, a signaling radio bearer 1 (SRB1) based on the first SRB-ToAddMod IE;
    receiving, by the terminal, a second SRB-ToAddMod IE;
    establishing, by the terminal, a signaling radio bearer 4 (SRB4) based on the second SRB-ToAddMod IE, wherein the first SRB-ToAddMod IE and the second SRB-ToAddMod IE are included in different radio resource control (RRC) messages;
    receiving, by the terminal from the base station via a first cell, a first RRC message comprising first configuration information, wherein the first configuration information comprises a first list and a rrc-SegAllowed, and wherein the first list comprises at least one measConfigAppLayer;
    generating, by the terminal, a second RRC message based on an application layer measurement report for a measConfigAppLayer of the at least one measConfigAppLayer being available, wherein the second RRC message comprises the application layer measurement report;
    generating, by the terminal, at least one ULDedicatedMessageSegment, by segmenting the second RRC message, based on the second RRC message being larger than a specific size and the first RRC message comprising the rrc-SegAllowed;
    transmitting, by the terminal to the base station via the first cell, the at least one ULDedicatedMessageSegment via the SRB4;
    receiving, by the terminal from the base station via the first cell, a third RRC message, wherein the third RRC message comprises second configuration information, and wherein the second configuration information comprises information for a second cell;
    transmitting, by the terminal to the base station via the second cell, a fourth RRC message in response to the third RRC message; and
    performing, by the terminal via the second cell, retransmission of the at least one ULDedicatedMessageSegment of the second RRC message via the SRB4.

2. A terminal in a wireless communication system, the terminal comprising:
    a transceiver configured to transmit and receive a signal; and
    a controller configured to control the transceiver to:
        receive, from a base station, a first SRB-ToAddMod information element (IE);
        establish a signaling radio bearer 1 (SRB1) based on the first SRB-ToAddMod IE;
        receive a second SRB-ToAddMod IE;
        establish a signaling radio bearer 4 (SRB4) based on the second SRB-ToAddMod IE, wherein the first SRB-ToAddMod IE and the second SRB-ToAddMod IE are comprised in different radio resource control (RRC) messages;
        receive, from the base station via a first cell, a first RRC message comprising first configuration information, wherein the first configuration information comprises a first list and a rrc-SegAllowed, and wherein the first list comprises at least one measConfigAppLayer;
        generate a second RRC message based on an application layer measurement report for a measConfigAppLayer of the at least one measConfigAppLayer being available, wherein the second RRC message comprises the application layer measurement report;
        generate at least one ULDedicatedMessageSegment, by segmenting the second RRC message, based on the second RRC message being larger than a specific size and the first RRC message comprising the rrc-SegAllowed;
        transmit, to the base station via the first cell, the at least one ULDedicatedMessageSegment via the SRB4;

receive, from the base station via the first cell, a third RRC message, wherein the third RRC message comprises second configuration information, and wherein the second configuration information comprises information for a second cell;

transmit, to the base station via the second cell, a fourth RRC message in response to the third RRC message; and perform, via the second cell, retransmission of the at least one ULDedicatedMessageSegment of the second RRC message via the SRB4.

* * * * *